Figure 1:
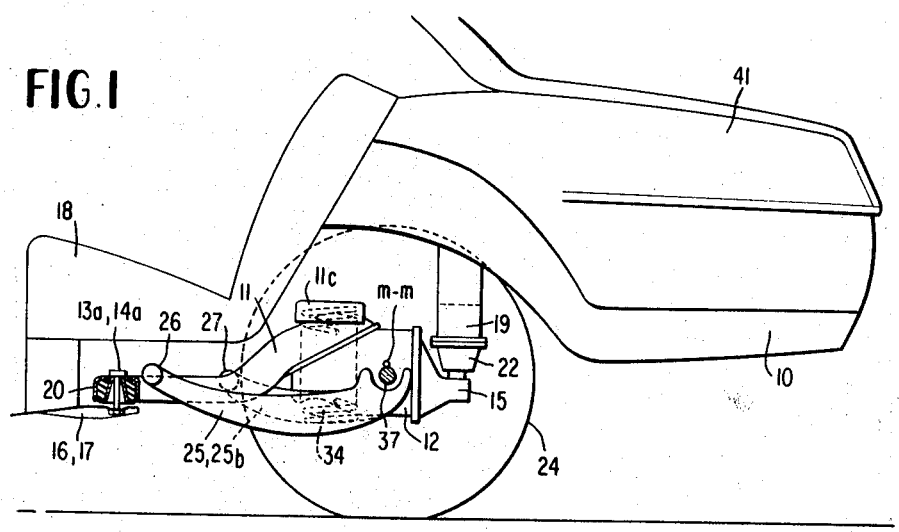

United States Patent

[11] 3,557,896

| [72] | Inventors | Josef Mueller<br>Stuttgart-Riedenberg;<br>Joachim Sorsche, Stuttgart-Schonberg;<br>Hans-Karl Daur, Stuttgart-Bad Cannstatt,<br>Germany |
|---|---|---|
| [21] | Appl. No. | 681,619 |
| [22] | Filed | Nov. 9, 1967 |
| [45] | Patented | Jan. 26, 1971 |
| [73] | Assignee | Daimler-Benz Aktiengesellschaft<br>Stuttgart-Unterturkheim, Germany |
| [32] | Priority | Nov. 11, 1966 |
| [33] | | Germany |
| [31] | | D51522 |

[54] REAR AXLE SUSPENSION OF MOTOR VEHICLES
27 Claims, 2 Drawing Figs.

[52] U.S. Cl. .................................................. 180/73
[51] Int. Cl. ............................................... B60g 11/00
[50] Field of Search ......................................... 180/73, 73C, 73D

[56] References Cited
UNITED STATES PATENTS

| 2,300,844 | 11/1942 | Olley ........................... | 180/73 |
| 2,919,760 | 1/1960 | Fehlberg et al. .............. | 180/73 |
| 3,157,242 | 11/1964 | Kozicki ....................... | 180/73 |
| 3,419,100 | 12/1968 | Enke ............................ | 180/73 |

Primary Examiner—A. Harry Levy
Attorney—Craig, Antonelli, Stewart & Hill

ABSTRACT: A rear axle suspension for motor vehicles in which the axle unit consists of an axle gear housing and of a support body, whereby the support body is of approximately V-shape with the V-tip extending over the axle gear housing at least within proximity of the wheel center axis, and in which the axle unit is elastically supported at the vehicle superstructure in three points; namely, near the rear of the axle gear housing and at the forward ends of the leg portions of the support body while the half-axles, constructed as thrust or inclined guide members are pivotally supported at the leg portions of the V-shaped support body.

PATENTED JAN 26 1971

3,557,896

INVENTORS
JOSEF MUELLER
JOACHIM SORSCHE
HANS-KARL DAUR

BY Craig & Antonelli

ATTORNEYS 3,557,896

REAR AXLE SUSPENSION OF MOTOR VEHICLES

BACKGROUND OF THE INVENTION

The present invention relates to a rear axle suspension of motor vehicles having a support body of V-shape, as view in plane view, and connected with the axle gear housing at the tip of the V, whose legs serve for support of the wheel supporting arms as thrust members, especially as inclined guide members, on a wide support base, especially by means of two bearing supports each.

With a known construction of the prior art, the support body is bent only slightly V-shaped and is connected relatively far from the center axis of the rear wheels with the rear axle housing so that the rear axle housing is loaded relatively strongly by the guide forces of the wheels and therefore has to be constructed relatively heavy.

SUMMARY OF THE INVENTION

The present invention aims above all at a type of construction which is characterized by as favorable as possible an absorption of the forces occurring at the rear axle unit, especially also of the wheel guide forces, as well as by a particularly favorable spatial incorporation in the vehicle construction. Accordingly, the present invention essentially consists in that the support body is extended at its V-tip, crossing over the axle gear housing, up to the wheel center axis or near the same.

In one particularly preferred embodiment of the present invention, the axle gear housing is connected over a wide surface with the support body over the entire width of the support body preferably enlarged at its V-tip, whereby the axle gear housing is attached to the support body, especially flangedly connected thereto, from below. The support body is advantageously bent S-shaped as viewed in side view of the vehicle in such a manner that it is offset or cranked with its forward end, preferably together with the bearing supports for the half-axles, below the rear seats or a corresponding vehicle utilization space and with its rear end constituted by the V-tip above the axle gear housing for the accommodation thereof.

The following advantages result from the present invention:

By the use of the V-shaped support body, the suspension points for the rear axle may be spaced apart as far as possible so that the torques acting on the axle housing can be absorbed with relatively slight bearing pressures. The rear axle housing does not need to be constructed thereby larger than necessary by its function, i.e., not larger than usual whereas V-shaped support body can be manufactured of sheet metal, especially of sheet metal stampings, preferably as hollow bearer. Notwithstanding the suspension points, which are spaced apart relatively far of the unit consisting of the V-shaped axle support and the axle gear housing, the unit may be of a relatively light weight and inexpensive type of construction.

To the stability and the favorable absorption of the forces contributes additionally the fact that the axle gear housing is connected on a wide surface with the V-shaped axle support or bearer extended toward the wheel center axis and thus a very reliable connection is achieved between the two parts of the axle gear unit.

It is furthermore possible by the cranking or offset of the V-shaped support or bearer over the axle gear housing to achieve a simple securing of the axle gear housing at the support body which is disposed near the rear suspension point of the axle gear housing so that the rear axle housing can be far reaching relieved from wheel guide forces. The height of the axle gear housing is not impaired by the support body and the axle gear housing may be arranged as near as possible to the road surface which contributes to a low center of gravity.

Preferably, the unit consisting of the carrier body and of the rear axle gear housing is elastically suspended at the vehicle superstructure for purposes of achieving as large as possible a bearing surface, on the one hand, at both ends of the legs of the support body and, on the other, at the rear end of the axle gear housing. The forward ends of the legs of the support body are thereby preferably so constructed that they are able to accommodate without any separate parts welded thereto the bearing dishes or sockets for the elastic suspension of the carrier body at the vehicle superstructure.

Furthermore, of the two spaced bearing supports of each half-axle, especially of an inclined guide member, the vehicle outer bearing support is arranged advantageously on the side of the support body facing the wheel center axis while the vehicle inner bearing support of the corresponding half-axle is arranged at the support body on the side thereof opposite the wheel center axis. As a result thereof, the half-axles may be so supported—as is also desirable for kinematic reasons as well as for reasons of a good roadability—that the pivot axes of the half-axles subtend a larger V-angle to each other than the two legs of the V-shaped support body. The half-axles are thereby advantageously supported in elastic or rubber joints.

Owing to the S-shaped curvature or offset of the support body—as viewed in sideview—the latter may be extended below the rear seats of the vehicle or below a corresponding utilization space without practically impairing the height of the seats. The space above the legs of the V-shaped support or bearer body may therefore be used practically to its full extent as useful space, for example, for the seats or also for the luggage space of the like to which also contributes the support body extended far toward the axle.

Preferably, the wheel springs which are supported, for example, as coil springs on the half-axles or inclined guide members, are arranged in such a manner that they are disposed as viewed in plan view, on the connecting line between the point of contact and the road and the bearing support of the half-axle on the inside of the vehicle. The bearing support for the half-axle on the vehicle outside is thereby relieved of vertical forces caused by the weight and the springs so that, especially with a view toward the dimensions and constructions of the rubber or elastic cushions utilized therefor, it can be designed in the most favorable manner for the wheel guidance in the longitudinal direction of the vehicle.

The wheel springs may be recessed into the half-axles or inclined guide members so that they rest practically on the lower wall section thereof. A large structural height for the springs is thereby achievable with a low luggage space floor. Furthermore, the wheel supporting arms or inclined guide members may be drawn so low as is permitted by the road clearance whereby they can be connected with the wheel carrier by a tubularly shaped offset. By the use of such an arrangement, the sensitive drive joints arranged at the wheel can simultaneously receive an effective protection against contact with the road and crushed stones or gravel.

Accordingly, it is an object of the present invention to provide a rear axle suspension for motor vehicles which obviates by extremely simple means the aforementioned shortcomings and drawbacks encountered in the prior art constructions.

Another object of the present invention resides in a rear axle suspension for motor vehicles which need not be constructed of relatively heavy weight, is able to assure a favorable absorption of the forces occurring at the rear axle unit, and distinguishes itself by a particularly favorable capacity of incorporation into the available space of the vehicle.

A further object of the present invention resides in a rear axle suspension which permits absorption of torques acting at the axle gear housing with relatively small bearing pressures while at the same time permitting a simple construction of the support body for the axle gear housing.

Still a further object of the present invention resides in a rear axle suspension for the axle unit of motor vehicles consisting of axle gear housing and support body in which the two parts of the axle unit are connected with each other in a completely reliable manner while at the same time relieving the rear axle housing far-reachingly from wheel guide forces.

Still another object of the present invention resides in a rear axle suspension of the type described above which produces a low center of gravity combined with favorable suspension kinematics and excellent readability of the vehicle.

A further object of the present invention resides in a rear axle suspension for motor vehicles in which the existing space is utilized in an optimum manner without impairment to the physical layout or structural considerations of the axle suspension.

Figure 2:
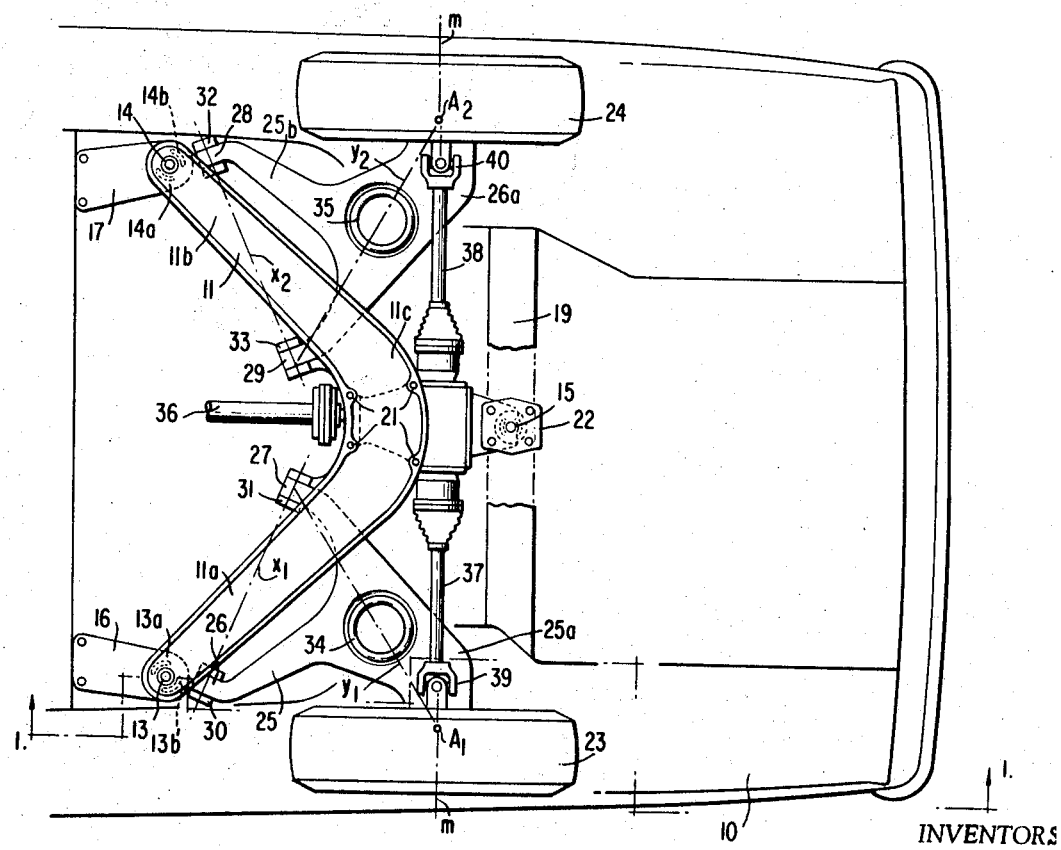

These and further objects, features and advantages of the present invention will become more obvious from the following description when taken in connection with the accompanying drawing which shows, for purposes of illustration only, one embodiment in accordance with the present invention and wherein:

FIG. 1 is a side elevational view of the rear section of a motor vehicle with a rear axle suspension in accordance with the present invention and taken along line 1-1 of FIG. 2; and FIG. 2 is a top plan view on the wheel axle suspension of FIG. 1, omitting the rear seat and upper body panels for the sake of clarity.

Referring now to the drawing wherein like reference numerals are used throughout the two views to designate like parts, reference numeral 10 designates there in a conventional vehicle superstructure, for example, a unitary structure consisting of frame and body. The unit consisting of the support or bearer body 11 and of the axle gear housing 12 is elastically supported at the vehicle superstructure 10 in three bearing points 13, 14 and 15 by the interposition of conventional elastic or rubber cushions whereby the bearing support in the points 13 and 14 is provided, for example, at bearing brackets or mounts 16 and 17 below the rear seats 18 of the vehicle or a utilization space and the bearing support in bearing point 15, for example, at a cross bearer 19 of the vehicle superstructure.

The support or bearer body 11 is made of two sheet metal stampings, preferably of thin walled sheet metal stampings curved or arched for purposes of achieving a large rigidity against bending with smallest possible weight, which are welded together into a hollow body with approximately oval cross section, and has approximately a V-shaped as viewed in plan view. As viewed in side view, the support body is bent approximately S-shaped in such a manner that the forwardly directed legs 11a and 11b of the support body 11 extending underneath the seats 18, terminate directly in sockets or dishes 13a and 14a or are connected with the same, for example, by pressing the same into appropriate apertures of the legs 11a and 11b, and accommodate by means of these sockets or dishes the elastic rings 20 serving the purpose of bearing support. The V-tip 11c of the support body 11 connecting the legs 11a and 11b with each other in a web like and arcuately-shaped manner, as can be seen in particular from FIG. 1, is cranked or offset over the axle gear housing so that the V-tip 11c reaches up to the wheel center axis $m$-$m$. The axle gear housing 12 consisting as a rule of cast iron is thereby connected in four points 21 over a wide surface with the support body 11 at the V-tip thereof whereby it can assume a low center of gravity position by reason of the flanged connection at the support body 11 from below.

The rear bearing point 15 is disposed on the rear side of the axle gear housing 12. For this purpose, the latter can be secured from below at the cross bearer 19 of the vehicle superstructure 10 by the interposition of an intermediate bearing piece 22 accommodating the rubber elements, for example, one or two rubber rings.

The wheels 23 and 24 are supported on thrust or inclined guide members 25 and 25b which are preferably drawn or extended so low as is permitted by the road clearance, and which are provided with strong pipe or dish-shaped offsets 25a and 26a for the connection with the wheel carriers. The inclined members 25 and 25b are constructed fork-shaped with bearing ends 26, 27, 28 and 29, spaced far apart from each other at the fork arms whose bearing axes $x_1$ and $x_2$, as viewed in plan view of the vehicle, extend at an inclination to each other in such a manner that they subtend among themselves a V-angle which is larger than the V-angle of the support body 11. The bearing ends 16 and 28 on the vehicle outside are thereby arranged on the side of the support body 11. The bearing ends 26 and 28 on the vehicle outside are thereby arranged on the side of the support body 11 facing the wheel center axis $m$-$m$ while the bearing ends 27 and 29 on the vehicle inside are arranged on the side of the support body 11 opposite the wheel center axis $m$-$m$, and are each supported—preferably under interposition of elastic or rubber elements—in bearing supports 30, 31, 32 and 33, which are welded to the support body 11 at the corresponding sides thereof.

For example, coil springs 34 and 35 serve the spring support of the wheels; the lower ends of the coil springs 34 and 35 are recessed in the inclined guide members and are therefore supported on the lower wall section thereof. A large structural height of the springs can be achieved thereby with nevertheless low luggage space floor. The springs 34 and 35 are arranged on straight lines $y_1$ and $y_2$, as viewed in plan view, which connect the points of road contact of the wheels $A_1$ and $A_2$ with the vehicle inside bearing supports 27 and 29 of the inclined guide members or wheel supporting arms 25 and 26, respectively. It is achieved thereby that the spring forces are absorbed practically completely by the vehicle inside bearing supports 27 and 29, whereas the vehicle outside bearing supports 26 and 28 are relieved of these forces and consequently, in particular also by reasons of their elastic bearing construction, can be so constructed as is desirable above all for advantageous absorption of the longitudinal forces extending in the driving direction.

The drive of the wheels takes place, for example, by an engine arranged in front by way of a cardan shaft 36 as well as by way of axle gear arranged in the axle gear housing 12 and by means of joint shafts 37 and 38 whose drive joints 39 and 40 in the wheel side are effectively protected by the tubularly shaped or trough-shaped offsets 25a and 26a of the inclined guide members or wheel supporting arms 25 and 26 against road contact and crushed stone or gravel. The moments occuring at the axle gear are transmitted with small lever forces to the support body 11 or to the vehicle superstructure as, inversely, the forces acting at the support body 11, especially spring forces, stress only relatively slightly the axle gear housing 12 by reason of the V-tip of the support body extended close to the wheel center axis $m$-$m$ and therewith also relatively near the rear bearing point 15. The large surface bearing support of the unit consisting of the support body 11 and of the axle gear housing 12 in the three points 13, 14 and 15, also contributes thereto.

Appropriately, the rubber or elastic elements in the three bearing points 13, 14 and 15 are so constructed that the rear bearing support point 15 absorbs preferably lateral guide forces and the two forward bearing supports in points 13 and 14 absorb the longitudinal forces. The rubber elements are so designed for this purpose that they are constructed, for example, solid or relatively solidly in the respective directions in which they are intended to primarily absorb the forces whereas in the cross directions with respect thereto they are constructed as soft as possible, for example, by reniform pockets or apertures. Prestresses in the bearing supports can be avoided thereby.

Since the inclined guide members 25 and 25b are pivotally connected at the support or bearer body 11 in the bearing supports 30 and 31 and in the bearing supports 32 and 33, respectively, by the interposition of rubber or elastic elements of conventional construction, there takes place under the influence of lateral forces acting on the wheels 23. and 24, arise, for example when driving through a curve, a rotation or twisting of the inclined guide members 25 and 25b about a respective axis disposed perpendicular to the axis $x_1$ and $x_2$.

Such undesirable wheel steering tendencies, especially oversteering tendencies, can be compensated for by an oppositely, approximately equally large rotation of the support body 11 about the bearing point 15. This compensation can be made possible in that the reniform apertures 13b and 14b in the rubber or elastic rings 20 are arranged in each case to both sides of the connecting line of the bearing points 13 and 15 or 14 and 15 and that the yieldingness of the different elastic elements is correspondingly matched.

A deflection of the support body 11 may also be achieved, of course, by another suitable construction—of any known type—of the elastic or rubber elements serving as bearing support.

As can be seen in particular from FIG. 1, the axle suspension of the present invention is capable of being incorporated into the space between the seats 18 and the rear luggage space 41 with the least possible space requirement of utilization space in that the space underneath the seat cushions, to the rear of the backrest and in front of or below the luggage space is utilized in a particularly favorable manner and a low luggage space floor is achievable thereby.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are encompassed by the scope of the appended claims.

We claim:

1. A rear axle suspension of motor vehicles having an axle gear housing, comprising support body means connected with the axle gear housing and having leg portions, said support body means being of substantially V-shape, as viewed in plan view, and said leg portions serving for the bearing support of wheel supporting arms on a wide bearing base, and said support body means being extended with its V-tip, crossing the axle gear housing, up to within proximity of the wheel center axis and being connected with the axle gear housing within the area of the V-tip, wherein three elastic bearing supports comprising a three-point support and including at each point buffers of rubberlike material for elastically suspending the unit consisting of the support body means and the rear axle gear housing at the vehicle superstructure, on the one hand, at the two ends of the leg portions of the support body means and, on the other, at the rear end of the axle gear housing.

2. A rear axle suspension according to claim 1, wherein the wheel supporting arms are constructed as thrust members.

3. A rear axle suspension according to claim 1, wherein the wheel supporting arms are constructed as inclined guide members.

4. A rear axle suspension according to claim 1, wherein said V-tip is extended up to within proximity of the wheel center axis by extending over said axle gear housing up to a vertical transverse plane which is arranged close to a vertical transverse plane passing through the wheel axle centers.

5. A rear axle suspension according to claim 1, wherein the axle gear housing is connected over a wide surface with the support body means substantially over the entire width thereof.

6. A rear axle suspension according to claim 5, wherein the support body means is widened at the V-tip.

7. A rear axle suspension according to claim 1 wherein said V-tip is extended up to within proximity of the wheel center axis by extending over said axle gear housing up to a vertical transverse plane which is arranged close to a vertical transverse plane passing through the wheel axle centers.

8. A rear axle suspension according to claim 1, wherein the support body means consists of at least one sheet metal stamping.

9. A rear axle suspension according to claim 1, wherein the support body means consists of several sheet metal stampings.

10. A suspension according to claim 1, wherein means are provided at the two forward elastic bearing supports at the ends of the leg portions of the support body means principally for the absorption of longitudinal forces whereas means are provided at the rear elastic bearing support primarily for the absorption of transverse forces.

11. A rear axle suspension according to claim 10, wherein said longitudinal and transverse force absorbing means include means for providing greater stiffness in said elastic bearing supports in one direction of two orthogonal directions.

12. A rear axle suspension according to claim 11, wherein said last-mentioned means includes aperture means in the elastic elements of the respective bearing supports.

13. A rear axle suspension according to claim 11, wherein the elastic elements located at the ends of the leg portions of the support body means are provided with aperture means to both sides of a line connecting the center of the respective bearing support with the third bearing support of the axle gear housing at the vehicle superstructure.

14. A rear axle suspension according to claim 1, further comprising means for spring supporting the wheels including spring means arranged substantially along the connecting line connecting the vehicle rear bearing support of a corresponding wheel supporting arm tact of the corresponding wheel with the road.

15. A rear axle suspension of motor vehicles having an axle gear housing, comprising support body means connected with the axle gear housing and having leg portions, said support body means being of substantially V-shape, as viewed in plan view, and said leg portions serving for the bearing support of wheel supporting arms on a wide bearing base, and said support body means being extended with its V-tip, crossing the axle gear housing, at least up to within proximity of the wheel center axis and being connected with the axle gear housing within the area of the V-tip, at least three elastic bearing supports are provided for elastically suspending the unit consisting of the support body means and the rear axle gear housing at the vehicle superstructure, on the one hand, at the two ends of the leg portions of the support body means and, on the other, at the rear end of the axle gear housing, and the axle gear housing being connected over a wide surface with the support body means substantially over the entire width thereof, wherein the support body means, as viewed in side view of the vehicle, is bent substantially S-shaped, the forward end of the thus S-shaped support body means having a lower positioned front end extending below a rear seat space of the vehicle and having a higher positioned rear end formed by the V-tipe above the rear axle housing for the support thereof.

16. A rear axle suspension according to claim 15, wherein the forward end of said support body means together with the bearing support for the wheel supporting arms extends underneath said aforementioned space.

17. A rear axle suspension according to claim 15 wherein each wheel supporting arm is supported on the respective leg portion of the support body means in two bearing supports, the vehicle outside bearing support of a respective wheel supporting arm facing the wheel center axis while the corresponding vehicle inside bearing support is arranged at the side of the support body means opposite the wheel center axis.

18. A rear axle suspension according to claim 17, wherein the support body means consists of at least one sheet metal stamping.

19. A rear axle suspension according to claim 17, wherein the support body means consists of several sheet metal stampings.

20. A rear axle suspension of motor vehicles having an axle gear housing, comprising support body means connected with the axle gear housing and having leg portions, said support body means being of substantially V-shape, as viewed in plan view, and said leg portion serving for the bearing support of wheel supporting arms on a wide bearing base, and said support body means being extended with its V-tip, crossing the axle gear housing, at least up to within proximity of the wheel center axis and being connected with the axle gear housing within the area of the V-tip, wherein at least three elastic bearing supports are provided for elastically suspending the unit consisting of the support body means and the rear axle gear housing at the vehicle superstructure, on the one hand, at the two ends of the leg portions of the support body means and, on the other, at the rear end of the axle gear housing wherein the support body means, as viewed in side view of the vehicle is bent substantially S-shaped, the forward ends of thus S-shaped support body means being positioned lower than the higher positioned rear end formed by the V-tip above the rear axle gear housing for the support thereof.

11. A suspension according to claim 20, wherein the two forward elastic bearing supports at the ends of the leg portions of the support body means serve principally for the absorption of longitudinal forces whereas the rear elastic bearing support serves primarily for the absorption of transverse forces.

22. A rear axle suspension according to claim 21, further comprising means for spring supporting the wheels including spring means arranged substantially along the connecting line connecting the vehicle rear bearing support of a corresponding wheel supporting arm with the point of contact of the corresponding wheel with the road.

23. A rear axle suspension according to claim 22, further comprising means providing greater stiffness of said elastic bearing supports in one direction of two orthogonal directions.

24. A rear axle suspension according to claim 23, wherein said last-mentioned means includes aperture means in the elastic elements of the respective bearing supports.

25. A rear axle suspension according to claim 24, wherein the elastic elements located at the ends of the leg portions of the support body means are provided with aperture means to both sides of a line connecting the center of the respective bearing support with the third bearing support of the axle gear housing at the vehicle superstructure.

26. A rear axle suspension of motor vehicles having an axle gear housing, comprising support body means connected with the axle gear housing and having leg portions, said support body means being of substantially V-shaped, as viewed in plan view, and said leg portions serving for the bearing support of wheel supporting arms on a wide bearing base, and said support body means being extended with its V-tip, crossing the axle gear housing, at least up to within proximity of the wheel center axis and being connected with the axle gear housing within the area of the V-tip, wherein each wheel supporting arm is supported on the respective leg portion of the support body means in two bearing supports, the vehicle outside bearing support of a respective wheel supporting arm facing the wheel center axis while the corresponding vehicle inside bearing support is arranged at the side of the support body means opposite the wheel center axis.

27. A rear axle suspension according to claim 26, wherein the vehicle outside bearing support is disposed in front of the corresponding vehicle inside bearing support, as viewed in the driving direction.